US008317616B2

(12) United States Patent
Angell et al.

(10) Patent No.: US 8,317,616 B2
(45) Date of Patent: Nov. 27, 2012

(54) SYSTEM, METHOD, AND ARTICLE OF MANUFACTURE FOR MULTI-PLAYER GAMING FROM AN OFF-SITE LOCATION

(75) Inventors: Robert Charles Angell, West Greenwich, RI (US); James Richard Lavoie, Voluntown, CT (US)

(73) Assignee: Rite-Solutions, Inc., Pawcatuck, CT (US)

( * ) Notice: Subject to any disclaimer, the term of this patent is extended or adjusted under 35 U.S.C. 154(b) by 617 days.

(21) Appl. No.: 11/138,886

(22) Filed: May 26, 2005

(65) Prior Publication Data

US 2006/0281538 A1 Dec. 14, 2006

Related U.S. Application Data

(63) Continuation-in-part of application No. 09/689,841, filed on Oct. 13, 2000, now Pat. No. 7,128,652.

(51) Int. Cl.
*A63F 13/00* (2006.01)

(52) U.S. Cl. ................ 463/42; 463/16; 463/17; 463/18; 463/19; 463/20; 463/25; 463/29; 463/40; 463/41; 463/43

(58) Field of Classification Search .................... 463/39, 463/16–20, 25, 29, 40–43
See application file for complete search history.

(56) References Cited

U.S. PATENT DOCUMENTS 4,240,635 A 12/1980 Brown
4,283,709 A 8/1981 Lucero et al.
4,335,809 A 6/1982 Wain
4,339,798 A 7/1982 Hedges et al.
4,467,424 A 8/1984 Hedges et al.

(Continued)

FOREIGN PATENT DOCUMENTS

DE 198 40 694 A1 3/2000

(Continued)

OTHER PUBLICATIONS

Pot-O-Gold, 19" Touchscreen Multi-Game Terminal Toucheasy Keno Play Description.

(Continued)

*Primary Examiner* — Sunit Pandya
(74) *Attorney, Agent, or Firm* — Ryan, Mason & Lewis, LLP

(57) ABSTRACT

A system, method, and article of manufacture are disclosed that comprise receiving, from one or more client terminals, two or more purchase requests, wherein each of the purchase requests identifies a wager for one or more multi-player games. A wager result is then determined for each wager at the time of purchase and stored in a database. Once all the wagers for an instance of a game are received, an outcome, such as a set of cards, is determined for each player and, if appropriate, the house (the host of the game). The outcome for each player is based on the previously determined wager result(s) and the type of game played. The outcome(s) are then stored with the wager(s) and wager result(s) in a transaction history file corresponding to each of the game's patrons (players) and in a game status file. A patron may then submit a request at a client terminal to reveal the results of the wager(s) and, optionally, the outcome of the game at either the gaming facility where the wagers were placed or at an off-site location.

26 Claims, 9 Drawing Sheets

U.S. PATENT DOCUMENTS

| | | | |
|---|---|---|---|
| 4,494,197 | A | 1/1985 | Troy et al. |
| 4,575,622 | A | 3/1986 | Pellegrini |
| 4,636,951 | A | 1/1987 | Harlick |
| 4,648,600 | A | 3/1987 | Olliges |
| 4,669,730 | A | 6/1987 | Small |
| 4,760,527 | A | 7/1988 | Sidley |
| 4,815,741 | A | 3/1989 | Small |
| 4,842,278 | A | 6/1989 | Markowicz |
| 4,856,787 | A | 8/1989 | Itkis |
| 4,880,237 | A | 11/1989 | Kishishita |
| 4,882,473 | A | 11/1989 | Bergeron et al. |
| 4,926,327 | A | 5/1990 | Sidley |
| 5,038,022 | A | 8/1991 | Lucero |
| 5,069,453 | A | 12/1991 | Koza et al. |
| 5,119,295 | A | 6/1992 | Kapur |
| 5,159,549 | A | 10/1992 | Hallman, Jr. et al. |
| 5,179,517 | A | 1/1993 | Sabin et al. |
| 5,197,094 | A | 3/1993 | Tillery et al. |
| 5,223,698 | A | 6/1993 | Kapur |
| 5,265,874 | A | 11/1993 | Dickinson et al. |
| 5,276,312 | A | 1/1994 | McCarthy |
| 5,287,269 | A | 2/1994 | Dorrough et al. |
| 5,297,802 | A | 3/1994 | Pocock et al. |
| 5,324,035 | A | 6/1994 | Morris et al. |
| 5,326,104 | A | 7/1994 | Pease et al. |
| 5,332,076 | A | 7/1994 | Ziegert |
| 5,371,345 | A | 12/1994 | LeStrange et al. |
| 5,408,417 | A | 4/1995 | Wilder |
| 5,429,361 | A | 7/1995 | Raven et al. |
| 5,586,937 | A | 12/1996 | Menashe |
| 5,613,912 | A | 3/1997 | Slater |
| 5,655,961 | A | 8/1997 | Acres et al. |
| 5,674,128 | A | 10/1997 | Holch et al. |
| 5,722,890 | A | 3/1998 | Libby et al. |
| 5,755,621 | A | 5/1998 | Marks et al. |
| 5,761,647 | A | 6/1998 | Boushy |
| 5,762,552 | A | 6/1998 | Vuong et al. |
| 5,770,533 | A | 6/1998 | Franchi |
| 5,797,794 | A | 8/1998 | Angell |
| 5,800,269 | A | 9/1998 | Holch et al. |
| 5,823,879 | A | 10/1998 | Goldberg et al. |
| 5,830,067 | A | 11/1998 | Graves et al. |
| 5,830,068 | A | 11/1998 | Brenner et al. |
| 5,830,069 | A | 11/1998 | Soltesz et al. |
| 5,836,817 | A | 11/1998 | Acres et al. |
| 5,857,911 | A | 1/1999 | Fioretti et al. |
| 5,871,398 | A | 2/1999 | Schneier et al. |
| 5,917,725 | A | 6/1999 | Thacher et al. |
| 5,949,411 | A | 9/1999 | Doerr et al. |
| 5,984,779 | A | 11/1999 | Bridgeman et al. |
| 6,024,640 | A | 2/2000 | Walker et al. |
| 6,048,269 | A | 4/2000 | Burns et al. |
| 6,089,982 | A | 7/2000 | Holch et al. |
| 6,120,024 | A | 9/2000 | Lind |
| 6,322,446 | B1 | 11/2001 | Yacenda |
| 6,347,086 | B1 | 2/2002 | Strachan |
| 6,358,151 | B1 | 3/2002 | Enzminger et al. |
| 6,383,078 | B1 | 5/2002 | Yacenda |
| 6,409,602 | B1 | 6/2002 | Wiltshire et al. |
| 7,470,196 | B1 * | 12/2008 | Joshi ............................... 463/42 |
| 2001/0003100 | A1 | 6/2001 | Yacenda |
| 2002/0055381 | A1 * | 5/2002 | Tarantino ......................... 463/20 |
| 2002/0103027 | A1 * | 8/2002 | Rowe et al. ...................... 463/39 |
| 2004/0166942 | A1 * | 8/2004 | Muir ............................... 463/43 |

FOREIGN PATENT DOCUMENTS

| | | |
|---|---|---|
| WO | WO 89/06998 | 8/1989 |
| WO | WO 97/39811 | 10/1997 |
| WO | WO 00/25281 | 5/2000 |

OTHER PUBLICATIONS

Pot-O-Gold, 19" Touchscreen Multi-Game Terminal Superpick Lotto Play Description.
Pot-O-Gold, 19" Touchscreen Multi-Game Terminal Touch 6 Lotto Play Description.
Pot-O-Gold, 19" Touchscreen Multi-Game Terminal Touch 6 Lotto Technical Description.
Pot-O-Gold, 19" Touchscreen Multi-Game Terminal Supergold Bingo Play Description.
Casinolink, Mikohn Worldwide.
Casinolink System, Mikohn Worldwide.
QuickTrack, Quick Track Gaming, Inc.
Oasis II, CDS Systems and Services.
The Future of Gaming Today, Casino Data Systems.
Casino Systems Solutions, IGT International Game Technology.
Welcome to Casino Data Systems, Casino Data Systems.
Introducing a World of Opportunities, Bally Systems.
Software Offerings, Advanced Computer Services.
SafeJack, Mikohn Worldwide.
Standing Stone Gaming Open Gaming Protocol (OGP) Specification, Integrated Performance Decisions, Version 2.1, pp. 1-58 (Apr. 5, 1999).
Yerak, B., "At Cashless Slots: You've Got Mail, and a Jackpot," USA Today, p. 2E (Nov. 13, 2000).
Monteau H., National Gaming Indian Commission.
Washburn, K.K., *National Gaming Indian Commission, AT&T Corp.* v. *Coeur D'Alene Tribe*, 45 F. Supp. 2d 995. D. Idaho (1998).
S. 692, 106th Congress, 1st Session.
H.R. 3125, 106th Congress, 2d Session.
Amendment in the Nature of a Substitute H.R. 3125, Offered by Mr. Goodlatte of Virginia.

* cited by examiner

100

SYSTEM, METHOD, AND ARTICLE OF MANUFACTURE FOR MULTI-PLAYER GAMING FROM AN OFF-SITE LOCATION

CROSS REFERENCE TO RELATED APPLICATIONS

The present invention is a continuation-in-part of Ser. No. 09/689,841 filed Oct. 13, 2000 now U.S. Pat. No. 7,128,652 entitled "System, Method, and Article of Manufacture for Gaming from an Off-Site Location," assigned to the assignee of the present invention and incorporated by reference herein.

FIELD OF THE INVENTION

The present invention relates generally to gaming, and more particularly, to a system, method, and article of manufacture for providing patrons with the ability to purchase wagers for multi-player games.

BACKGROUND OF THE INVENTION

Gaming facilities (e.g., casinos) operate in a highly competitive environment. To maximize revenues, these facilities try to attract new and repeat patrons by making patrons feel welcome and appreciated. For example, these facilities often offer patrons a wide variety of amenities and services other than gaming, such as restaurants and valet services, and entertainment options like concerts and theater events. Moreover, successful gaming facilities must continually update the games, amenities, and services that they offer patrons in order to remain competitive.

New entrants to the gaming industry face even more difficulty. For example, enormous amounts of capitol are necessary to fund the design and development of a new gaming facility. These problems prevent non-gaming type hospitality facilities, such as hotels, motels, amusement parks, theme parks, and resorts, and retail facilities, such as grocery stores and gas stations, from entering the gaming industry.

One way for gaming facilities to increase revenues and for non-gaming facilities to enter into the gaming industry would be for each to provide patrons with the ability to play from an off-site location (e.g., from home) via an online network (e.g., the Internet). These facilities, however, face many problems associated with providing off-site gaming over an online network.

One problem is that patrons do not have confidence in the security of the online networks, such as the Internet, and thus, are hesitant to provide personal information and/or to purchase wagers over online networks. Another problem is that gaming via online networks, such as the Internet, is not legal in many places. Therefore, these facilities may not be able to provide their patrons with such an ability.

U.S. Pat. No. 7,128,652 entitled "System, Method, and Article of Manufacture for Gaming from an Off-Site Location" discloses a system and methods for providing patrons with the ability to purchase wagers at a gaming facility and to reveal the results of the wagers at the gaming facility or an off-site location A need exists, however, for a method and system to enable patrons to purchase wagers in multi-player games, wherein the results of the wagers may be revealed at an off-site location. A need also exists for a method and system to enable patrons to share in the experience of playing multi-player games with friends and family.

SUMMARY OF THE INVENTION

A system, method, and article of manufacture are disclosed that comprise receiving, from one or more client terminals, two or more purchase requests, wherein each of the purchase requests identifies a wager for one or more multi-player games. A wager result is then determined for each wager at the time of purchase and stored in a database. (A wager result is an indication of whether the wager was a winning or losing wager.) Once all the wagers for an instance of a game are received, an outcome, such as a set of cards, is determined for each player and, if appropriate, the house (the host of the game). The outcome for each player is based on the previously determined wager result(s) and the type of game played. The outcome(s) are then stored with the wager(s) and wager result(s) in a transaction history file corresponding to each of the game's patrons (players) and in a game status file. A patron may then submit a request at a client terminal to reveal the results of the wager(s) and, optionally, the outcome of the game at either the gaming facility where the wagers were placed or at an off-site location.

A more complete understanding of the present invention, as well as further features and advantages of the present invention, will be obtained by reference to the following detailed description and drawings.

DETAILED DESCRIPTION

Figure 1:
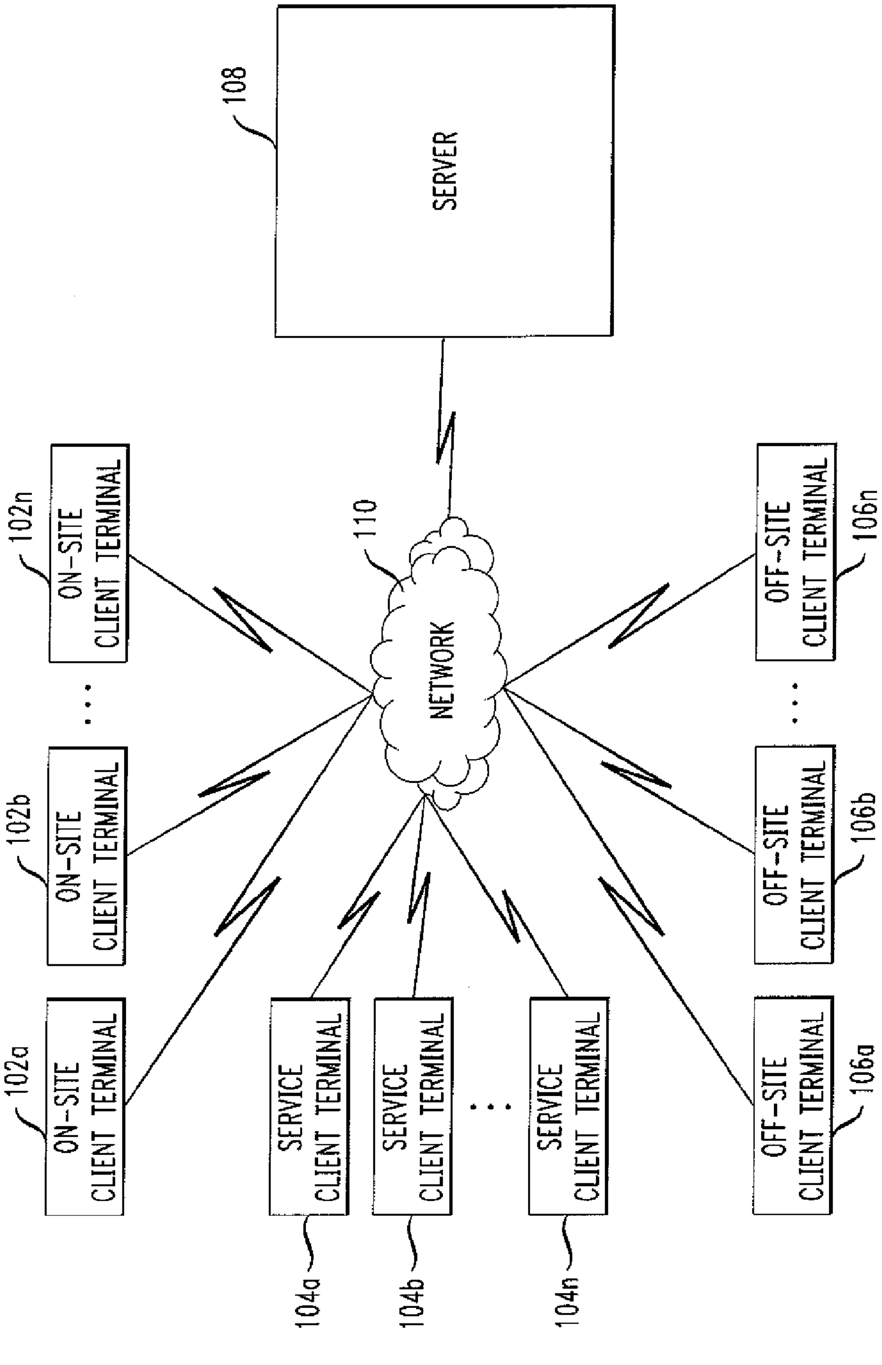
FIG. 1 is a block diagram of an exemplary gaming system consistent with the present invention.

The present invention allows a patron to place wagers at a gaming facility and to reveal the results of the wager at an off-site location (e.g., the patron's home) via an online network (e.g., the Internet). The patron may be assigned a unique patron identifier or a sending device (such as a magnetic card or a transmitter) that contains a unique patron identifier. The patron may use the patron identifier or the sending device to log onto a client terminal located at a gaming facility. (For security purposes, the patron also may be required to, for example, enter a preestablished personal identification number (PIN) or use biometric authentication.) The patron may then place one or more wagers on one or more games, and may then reveal the results of the wagers at the gaming facility where the wagers were placed, or at an off-site location via the online network. In the present invention, a wager result is defined as the result of the wager: win, loss, or tie. The wager result optionally includes an indication of the amount of money won, wherein the amount is a function of the amount wagered; the amount may be an absolute value, or a proportional value (e.g., two times the amount of the wager). An outcome is defined as the result of a game for each player and, if applicable, for the house (the host of the game), and is determined based on the wager result(s) for a game and the type of game. For example, in a game of keno, the outcome is a set of numbers; for a game of five card stud poker, the outcome is a set of five cards. If a wager is a winning wager, then a winning outcome is selected for the player; if a wager is a losing wager, then a losing outcome is selected for the player.

In addition to placing wagers on single player games, such as slot games, patrons may also place wagers on games involving multiple players. Multi-player games include games where each player is playing against the house (e.g., keno, blackjack, and craps) or playing against other players (e.g., poker and high card). In the case of multi-player games against the house (e.g., blackjack), a single outcome for the house and individual outcomes for each player are determined based on the wager results that were determined at the time of purchase. In some multi-player games (e.g., keno), the players select their own "outcome." For example, in a keno game, each player selects a set of numbers. A single set of numbers is then determined for the house based on the wager results that were previously determined for each player.

In the case of multi-player games between players, the wager results are again determined at the time of purchase. Once all wagers for a game have been received and wager results have been determined, an outcome is determined for each player. For example, in a game of high card, a single card is selected for each player from a deck of 52 cards based on the wager result(s). The player associated with the winning wager receives the highest value card and wins the sum of all the game's wagers; the remaining players lose their wager. In one exemplary embodiment, if more than one player has a wager result indicating a win, each of the winning players is assigned the highest value card, and the sum of all the game's wagers is split evenly among the players having the highest value card. In another exemplary embodiment, the winning player is awarded an amount equal to the sum of the wagers of all the game's players minus a sum determined by the facility hosting the game.

In another multi-player game, such as five card stud poker, five cards are selected for each player from a single deck of 52 playing cards (in a round-robin fashion) based on the wager results determined at the time of purchase. The player with the winning wager will be assigned the highest ranking set of cards. The rules of the well known five card stud poker game are used to determine the highest ranking set of cards. In one exemplary embodiment, the winning player is awarded an amount equal to the sum of the wagers of all the game's players. In another exemplary embodiment, the winning player is awarded an amount equal to the sum of the wagers of all the game's players minus a sum determined by the gaming facility hosting the game.

FIG. 1 is a block diagram of an exemplary gaming system 100 consistent with the present invention. Exemplary gaming system 100 allows patrons (users or players) to place wagers at a gaming facility and to reveal the results of the wagers at the gaming facility (on-site) or at an off-site location. A gaming facility may include, but is not limited to, a hospitality facility (e.g., casinos, hotels, motels, amusement parks, theme parks, and resorts) and a retail facility (e.g., grocery stores and gas stations).

As shown, system 100 may include one or more on-site client terminals 102*a*-102*n*, one or more service client terminals 104*a*-104*n*, one or more off-site client terminals 106*a*-106*n*, and a server 108, which are interconnected by a network 110. In the following description, a single on-site client terminal 102*a*, a single service client terminal 104*a*, and a single off-site client terminal 106*a* are referred to as on-site client terminal 102, service client terminal 104, and off-site client terminal 106, respectively. Moreover, on-site client terminals 102*a*-102*n*, service client terminals 104*a*-104*n*, and off-site client terminals 106*a*-106*n* are collectively referred to as client terminals.

On-site client terminals 102*a*-102*n* are used by players, for example, to purchase wagers and/or perform other tasks, such as play traditional on-site games, locate other patrons, and/or communicate with other patrons in the facility. Service client terminals 104 are used generally by facility personnel to accomplish administrative and management tasks, such as opening accounts for patrons or generating various internal reports. In certain instances, users may use service client terminals 104 to perform tasks typically accomplished with an on-site client terminal 102. Off-site client terminals 106*a*-106*n* are located outside of the facility, for example, at a patron's home. Using an off-site client terminal 106, a patron may reveal the results of previously purchased wagers and/or perform other tasks, such as communicating and/or locating other patrons at a facility or other patrons who may be logged onto other off-site client terminals 106*a*-106*n*. In one alternative embodiment, the off-site client terminal 106 also may be used to purchase wagers.

Server 108 may be a computer or a similar device that maintains and serves on-site client terminals 102*a*-102*n*, service client terminals 104*a*-104*n*, and off-site client terminals 106*a*-106*n*. In addition, server 108 may receive a wager purchase request, debit a patron's account balance based on the purchase request, determine the results of each wager, store the results of each wager in a game status file and a transaction history file corresponding to the patron's account, compute and store game outcomes, and receive and process wager reveal requests. In an alternative embodiment, server 108 may send wager purchase and/or reveal requests to another server or system for processing.

Network 110 may be a single or a combination of any type of computer network, such as a Local Area Network (LAN) or a Wide Area Network (WAN). For example, network 110 may comprise an Ethernet network operating according to the IEEE 802.3 standard. In addition, network 110 may be a combination of public (e.g., Internet) and private networks.

Figure 2:
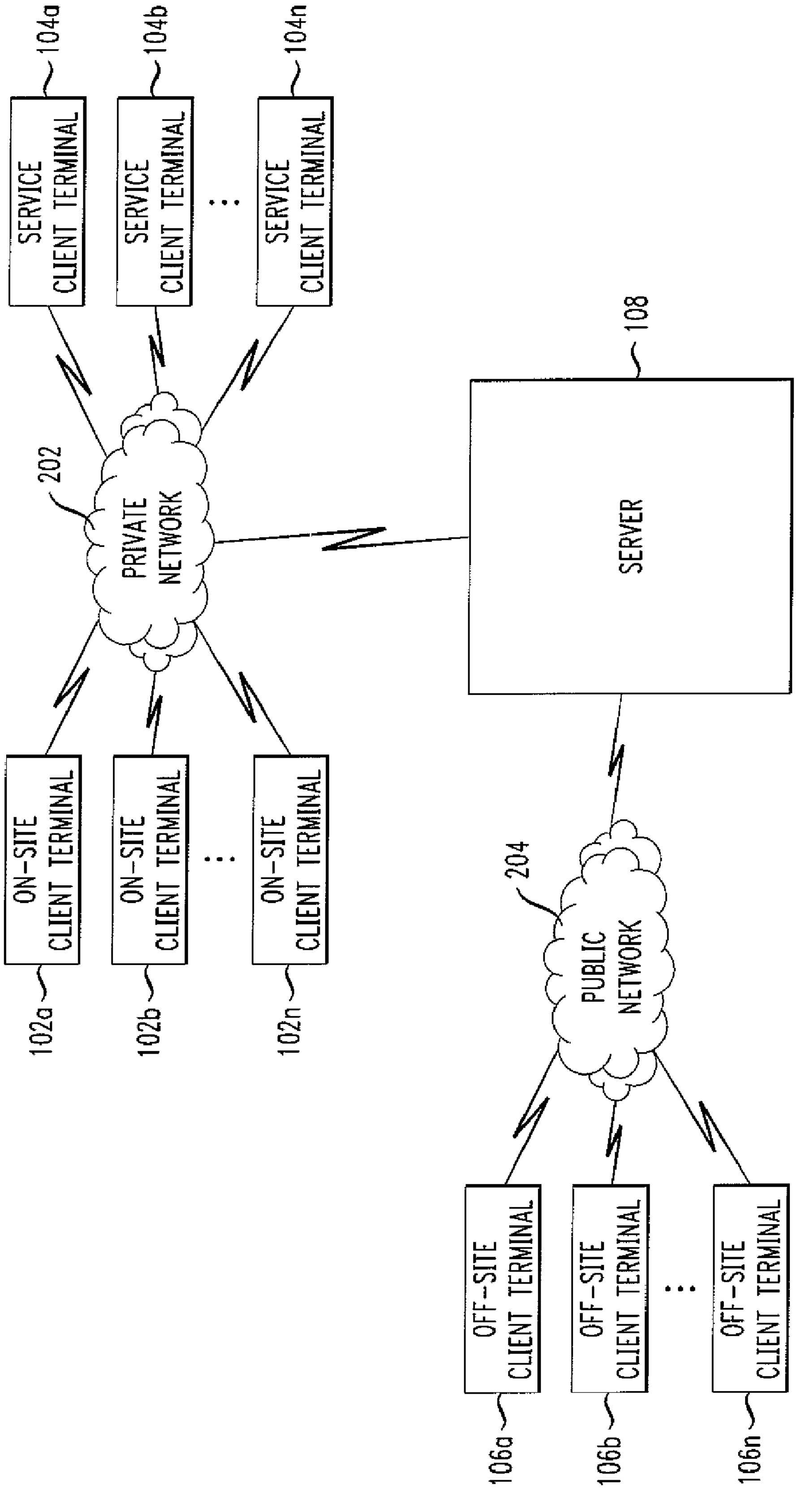
FIG. 2 is a block diagram of an alternative embodiment of the exemplary gaming system of FIG. 1.

FIG. 2 is a block diagram of an alternative embodiment of the exemplary gaming system of FIG. 1. As shown in FIG. 2, network 110 may include a public network 204 (e.g., the Internet) and a private network 202 (e.g., a LAN). The other components shown in FIG. 2 are similar to the components shown in FIG. 1 and thus, will not be described in further detail. Moreover, in one alternative embodiment, network 110 may be a combination of virtual LANs.

Figure 3:
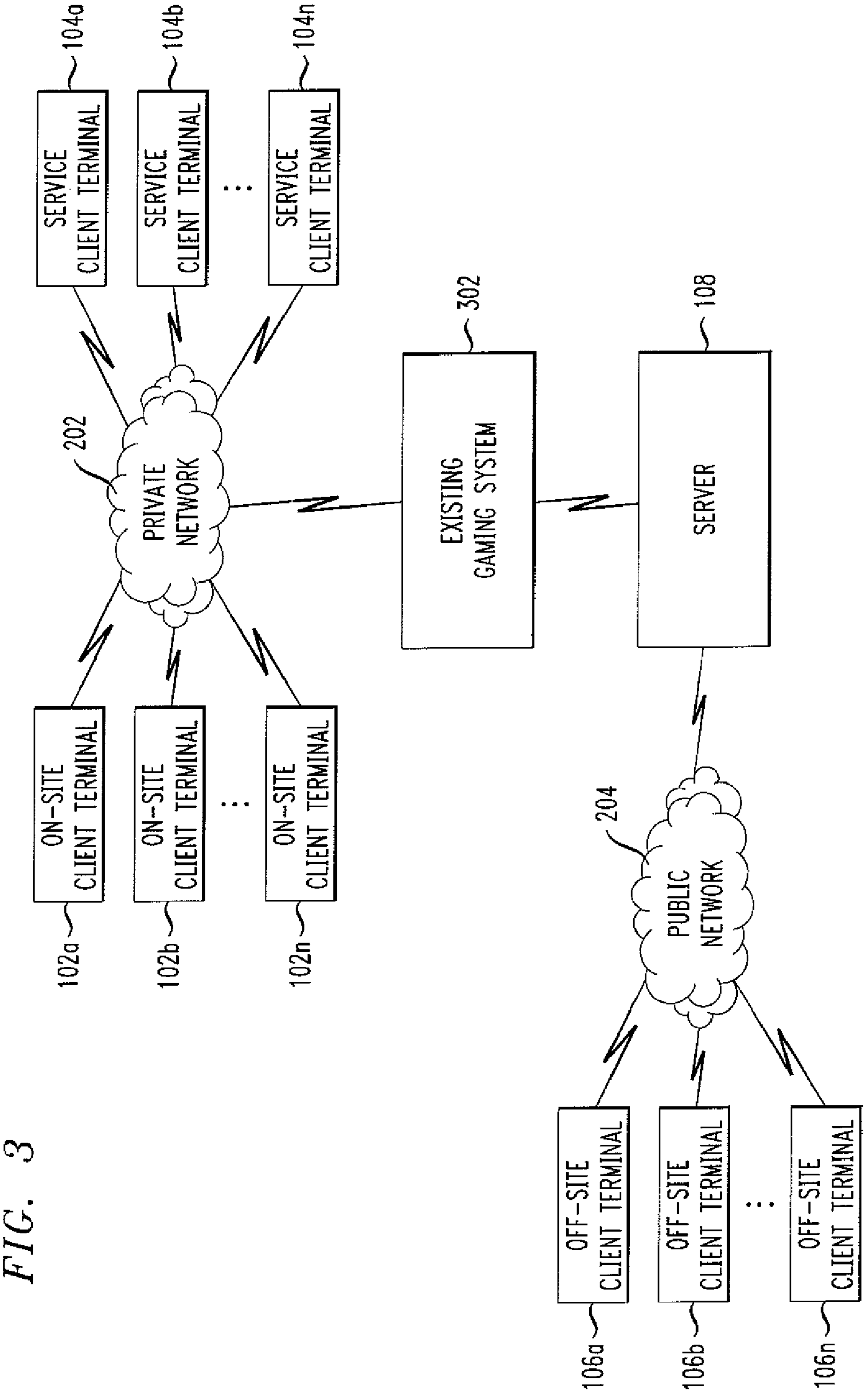
FIG. 3 is a block diagram of an alternative embodiment of the exemplary gaming system of FIG. 2.

FIG. 3 is a block diagram of an alternative embodiment of the exemplary gaming system of FIG. 2. As shown in FIG. 3, systems, methods, and articles of manufacture consistent with the present invention may be combined with an existing gaming system 302. The existing gaming system 302 may be any gaming system, such as the video game system disclosed in the '556 application and/or the cashless gaming system disclosed in the '375 application and/or the '128 patent. In this example, a patron may use a client terminal 102 that exists in the existing gaming system 302 or system 100 to send a wager purchase request to the existing gaming system 302. Upon receiving the wager purchase request, the existing gaming system 302 may forward the request to server 108 along with the patron's patron identifier. In an alternative embodiment, the wager purchase request may be automatically generated whenever the patron logs off the client terminal 102 in existing system 302.

Figure 4:
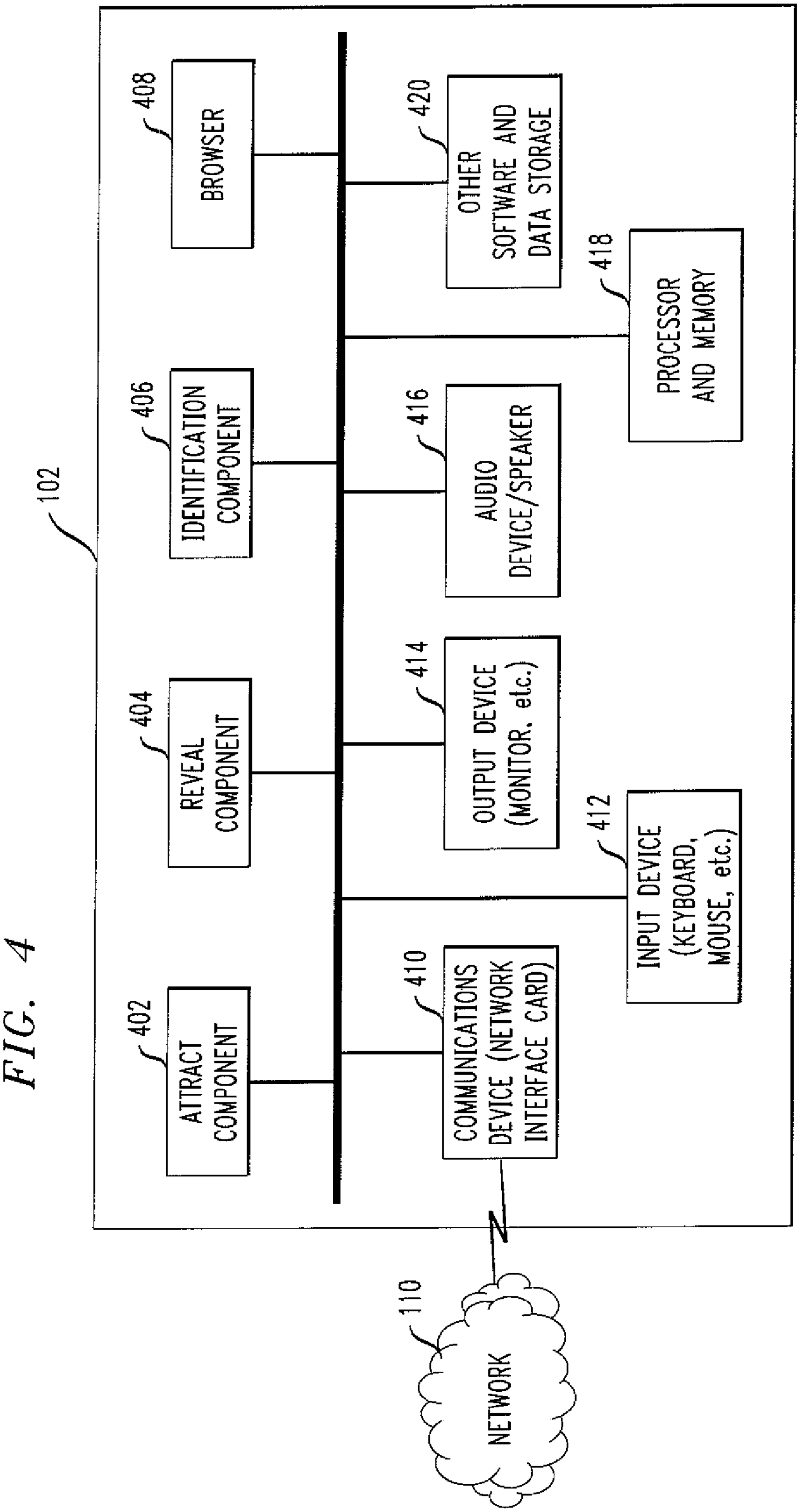
FIG. 4 is a block diagram of an exemplary client terminal consistent with the present invention.

FIG. 4 is a block diagram of an exemplary on-site client terminal 102 consistent with the present invention. As shown, on-site client terminal 102 includes an attract component 402, a reveal component 404, an identification component 406, a browser 408, a communications device 410, an input device 412, an output device 414, an audio device/speaker 416, processor and memory 418, and/or other software and data storage 420.

Attract component 402 comprises a software application for displaying attract mode graphics to attract a patron to on-site client terminal 102, Reveal component 404 comprises a software application running electronic games, such as keno, blackjack, or a slot machine type (e g , spinning reel or a multi-line reveal) game. A patron may use the reveal component 404 to reveal the results of previously purchased wagers The server 108 may send the result of each wager to the reveal component 404 and depending on the result, the reveal component may display a particular graphical user interface indicating a win or a loss. For example, if the result of a wager is a win in the amount of $1 and the patron is playing a "spinning fruit" game, which is a type of a spinning reel game, the reveal component 404 may display a graphical user interface (e.g , three apples) that indicates a win amount of $1. On the other hand, if the patron won $ 50, the reveal component 404 may display a graphical user interface (e g , two apples and one orange) that indicates a win amount of $0.50.

Identification component 406 may be a combination of software and/or hardware and assists a patron in logging onto a client terminal 102. In one embodiment, the identification component 406 may include a receiving device and a software driver to support the receiving device. The receiving device may include a magnetic card reader, a smart card reader, a radio frequency receiver, an infrared frequency receiver, a magnetic device detector, or any similar device known to those skilled in the art that retrieves or receives patron identifier information. The type of sending device may dictate the type of receiving device.

Browser 408 may include a conventional software application, such as NETSCAPE NAVIGATOR or INTERNET EXPLORER, for issuing HTTP requests to the server 108. In one embodiment, instead of using the reveal component 404, a patron may use browser 408 to reveal the results of previously purchased wagers. In still another embodiment, a patron may use browser 408 in combination with reveal component 404 to reveal the results of previously purchased wagers.

Communications device 410 may include an interface device that transmits information from the on-site client terminal 102 to network 110 and receives information that is addressed to on-site client terminal 102 from network 110. For example, communications device 410 may be a network interface card or a modem.

Input device 412 may include a device that is used for receiving input from a patron. For example, input device 412 may include a keyboard, a keypad, or a pointing device (e.g., a mouse or a trackball). An input device may not be necessary, however, because the patron may be able to use output device 414, for example, if the output device 414 includes a touch screen.

Output device 414 may include a device that displays information to users and/or receives inputs from users. For example, output device 414 may comprise a conventional touch screen video monitor for displaying video graphics and receiving patron inputs, such as a PIN. A touch screen may not be necessary, however, since patron inputs can be made through an input device 412.

On-site client terminal 102 also may include an audio device/speaker module 416 that comprises a conventional audio card, amplifier, and/or speaker for presenting audio. In addition, on-site client terminal 102 also may include processor and/or memory 418. The processor may control the components of client terminal 102 and assist in processing requests received from components.

It will be apparent to one skilled in the art that on-site client terminal 102 may include some or all the components shown in FIG. 4. For example, in a facility that does not want patrons to have the ability to reveal the results of previously purchased wagers on-site, the On-site client terminals 102*a*-102*n* may not include the reveal component 404. Furthermore, although not shown, the service client terminal 104 and the off-site client terminal 106 also may include some or all of the components that are included in the on-site client terminal 102 shown in FIG. 4.

Figure 5:
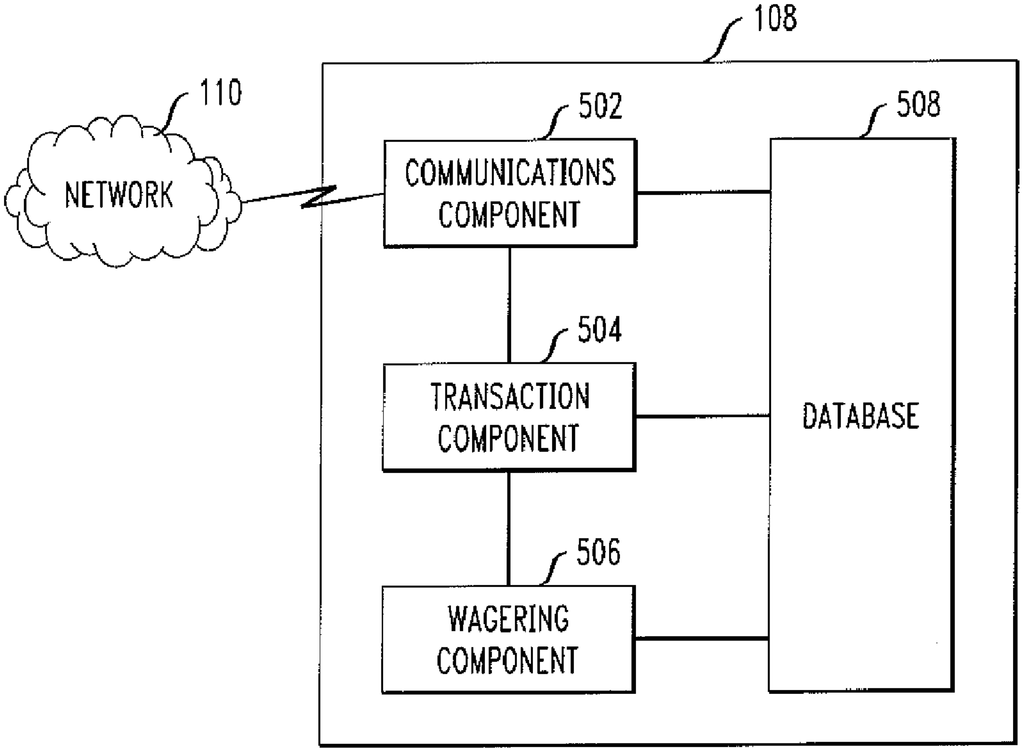
FIG. 5 is a block diagram of an exemplary server consistent with the present invention.

FIG. 5 is a block diagram of an exemplary server 108 consistent with the present invention. As shown, server 108 includes a communications component 502, a transaction component 504, a wagering component 506, and a database 508. Additional servers 108 may be added to assist with load balancing; some servers 108 may be used for on-site requests and other servers 108 may be used for off-site requests. For example, some servers 108 may be used to process wager purchase and reveal requests that are received from on-site client terminals 102*a*-102*n* and others may be used to process wager purchase and reveal requests that are received from off-site client terminals 106*a*-106*n*.

Database 508 stores patron account files for each patron and game status files. Each patron account file may include, for example, the patron's identifier (e.g., account number), the patron's identification information (e.g., name, address, and/or date of birth), the patron's preference information (e.g., preferred beverage, snack, language, restaurant, and/or golf course), and a transaction history file for storing the results of purchased wagers. Each game status file contains the patron identifier of each player that placed a wager in the corresponding game, the outcome for each player and the house (if necessary), and the results of each player's wager.

Communications component 502 may include a combination of software and hardware devices, such as a web server and a network interface card. Communications component 502 may receive messages from and send messages to client terminals. Communications component 502 may identify a patron by comparing, for example, the patron's patron identifier to the patron account and then, authenticating the patron by comparing, for example, the patron's PIN, to the patron account. Communications component 502 also may decode, decrypt, and error check messages received from client terminals 102. It also may encode and encrypt messages to client terminals 102.

Communications component 502 also may act as an interface between the client terminals 102 and the other components of the server 108. In one embodiment, communications component 502 may send messages, such as wager purchases and reveal requests, to the transaction component 504 and/or wagering component 506 for further processing. In another embodiment, communications component 502 may retrieve results of previously purchased wagers from database 508 and send these results to the client terminals 102. Although not shown, communications component 502 may include a database interface for writing information into and retrieving information from database 508. In still another embodiment, the communications component may determine if the patron account has sufficient balance to purchase wagers and, if it does have sufficient balance, may debit the patron's account for the purchase amount and send the request to wagering component 506 for further processing. If the patron's account does not have sufficient balance, the communication component 502 may send a message to the client terminal 102 for display to the patron notifying the patron that the patron has insufficient funds.

Transaction component 504 may receive requests from communications component 502 and may forward the requests to wagering component 506. Transaction component 504 generally tracks all transactions being processed by server 108 and may be used in conjunction with service client terminal 104 to generate reports, such as authentication failures or usage reports.

Wagering component 506 receives wager purchase requests from transaction component 504 and/or communications component 502. In addition, wagering component 506 may process the wager purchase request or send the request to another component or server for processing. To process a wager purchase request, the wagering component may calculate the number of wagers if the number was not specified by the patron or if the patron just specified the purchase amount. The number of wagers may be calculated, for example, by dividing the purchase amount by the denomination value. The wagering component determines the result of each wager by using any one of a number of methods that are well known to those skilled in the art and are within the scope of the present application. Examples include using electronically controlled random number generators or using predefined yet shuffled outcome values (e.g., random multipliers). As an example, if predefined yet shuffled outcome values, such as random multipliers, are used, and if a patron purchases ten wagers, the result of each of the ten wagers may be calculated by multiplying the denomination value of each wager by the corresponding random multiplier. Wagering component 506 also computes and stores game outcomes (as described above).

Server 108 also includes a database 508. Database 508 stores patron account files, each patron account file including a patron identifier and a transaction history file, and a game status file, including a game identifier. As the wagering component 506 determines the result of each wager, it stores the result in the appropriate transaction history file in database 508 so that the results can later be revealed using this transaction history file, and in the game status file. Database 508 may also store graphical menus and other multimedia information. Once all wagers and wager results have been received for a game, server 108 computes and stores the game outcome (s) in the appropriate transaction history file(s) and in the game status file.

In accordance with one embodiment of the present invention, a patron wishing to use system 100 may establish a patron account for storage in server 108. This account may be established, for example, at a service client terminal 104, which may be located, for example, at the front desk of a hotel. To establish an account, the patron may need to provide some identifier information (e.g., name, address, and/or date of birth) and preference information (e.g., preferred beverage, snack, language, restaurant, and/or golf course). Once the patron provides the requested information, service client terminal 104 sends the information to server 108, which in turn establishes a patron account file for the patron and issues the patron a unique patron identifier, which may include letters, numbers, or a combination of both. In addition, during account establishment, the patron may be asked to select a personal identification number ("PIN") via an input device, such as a keypad. In another embodiment, the patron identifier may be stored on a sending device (e.g., magnetic card) and the sending device may be given to the patron. In still another embodiment, in addition to storing the patron identifier, an encrypted version of the PIN also may be stored on the sending device.

The sending device may be a magnetic card, a smart card, a credit card, a debit card, a radio frequency transmitter, an infrared frequency transmitter, a magnetic device, or a similar device that can store a patron identifier. In one embodiment, the sending device may transmit a patron identifier to, for example, an identification component of the client terminals For some types of sending devices, a number preassigned to the sending device may be used as the unique patron identifier and, thus, server 108 need not generate a patron identifier For example, if the sending device is a credit card or a debit card, the account number imprinted on the credit card or debit card may be used as the patron identifier.

After logging onto an on-site client terminal 102, the patron may use an input device at the client terminal 102 to enter a request to purchase at least one wager. The on-site client terminal 102 then sends a wager purchase request to server 108. The term wager, as used in this application, refers to playing one game (e.g., one pull on a slot machine type game). As part of the purchase request, the patron may be required to specify selection information, such as a purchase amount, number of wagers, and/or a denomination value for each wager. For multi-player games, the patron may select a particular instance of a particular type of game by utilizing a game identifier. After server 108 receives the request, it debits the account balance corresponding to the patron's account based on the request, for example, by subtracting the purchase amount from the patron's account balance. Server 108 immediately determines the result of each wager at the time of purchase by using one of a number of different well known methods and stores the result of each wager in a transaction history file corresponding to the patron's account. For multi-player games, server 108 stores the wager results in a game status file. Once all the wagers for a particular game have been received, server 108 determines an outcome for each player (and, if applicable, for the house) that coincides with the wager result(s).

Once the results of the wagers have been determined and stored by server 108 on-site, the patron may use an off-site client terminal 106, such as a computer located at the patron's home, to reveal the results of the wagers and, optionally, the outcome of the game. (In one embodiment, the patron may also use an on-site client terminal 102 or service client terminal 104 to reveal the results of the wagers.) The off-site client terminal 106 connects to the on-site server 108 via a public network 204, such as the Internet. Server 108 identifies the proper patron account and transaction history file through receipt of the patron identifier, and optionally, a preestablished PIN or biometric information.

The results of the wagers may be revealed to the patron by using a reveal component, such as a black jack, a keno, or a slot machine type (e.g. spinning reel or multi-line) graphical user interface application, which may be stored on the off-site client terminal 106. For multi-player games, the outcomes and wager results for the game's other players may also be revealed. In an alternative embodiment, the outcomes and wager results for each player are identified by a player name or player selected nickname.

The server 108 may send the result of each wager to the reveal component, which may in turn display a different graphical user interface depending on whether the result was a win or a loss. The patron may continue to reveal the remaining wagers or stop playing at any time. If a patron prefers to receive the total amount won or lost after processing of all of the purchased wagers rather than reveal the results one at a time, the patron may ask a clerk at service client terminal 104 for that information.

After the patron has finished playing, the patron may go back to the facility to collect his or her account balance, which may be adjusted by an amount reflecting any money won or lost by the patron when he or she revealed any wagers. Thus, systems, methods, and articles of manufacture consistent with the present invention receive wager purchase requests from patrons at the gaming facility and determine the results of the wagers at the gaming facility, but may reveal the results of the wagers at a location other than at the gaming facility.

Figure 6A:
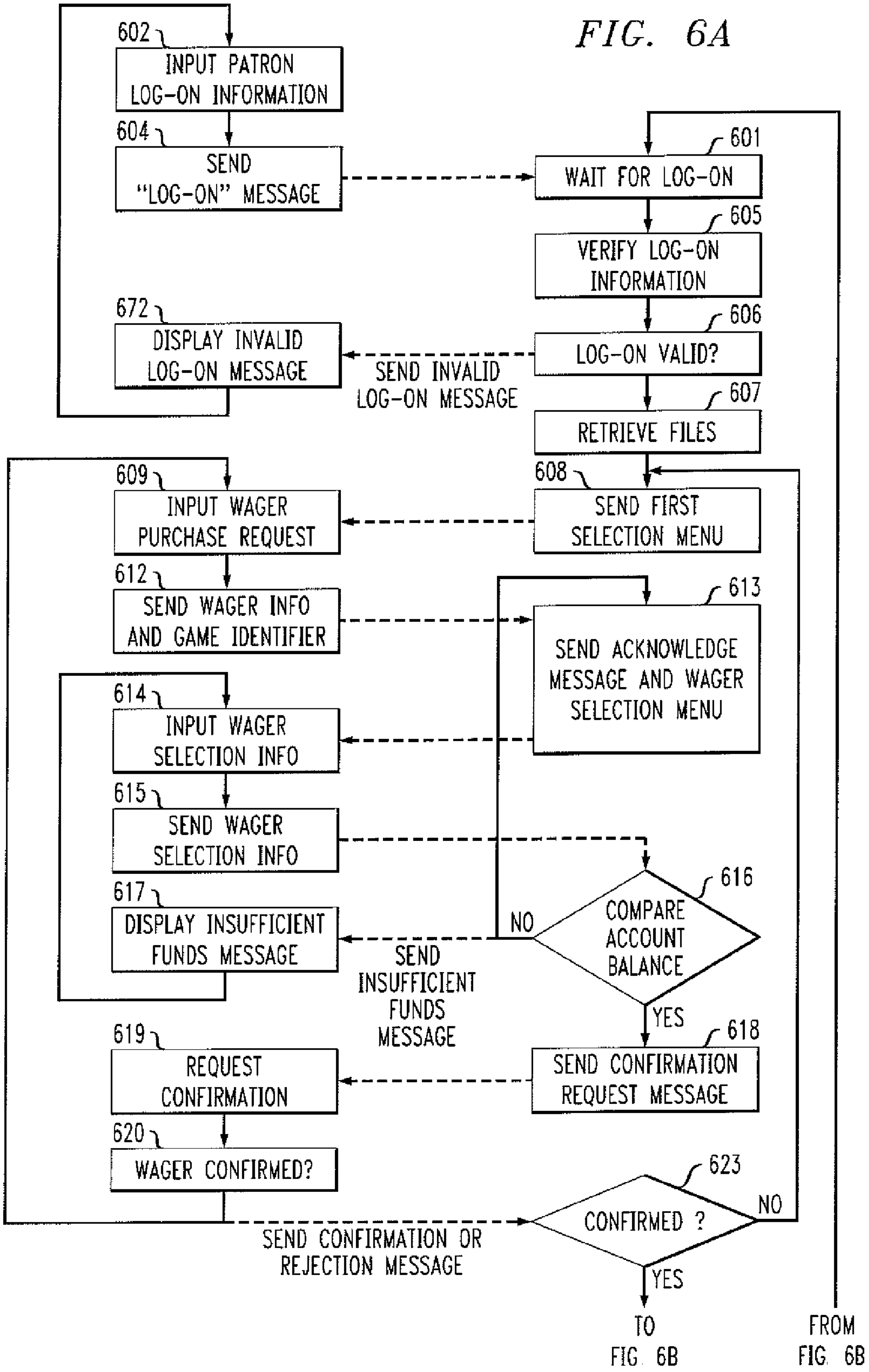
FIG. 6 is a flow diagram of an exemplary method of operating the exemplary gaming system of FIG. 1.
Figure 6B:
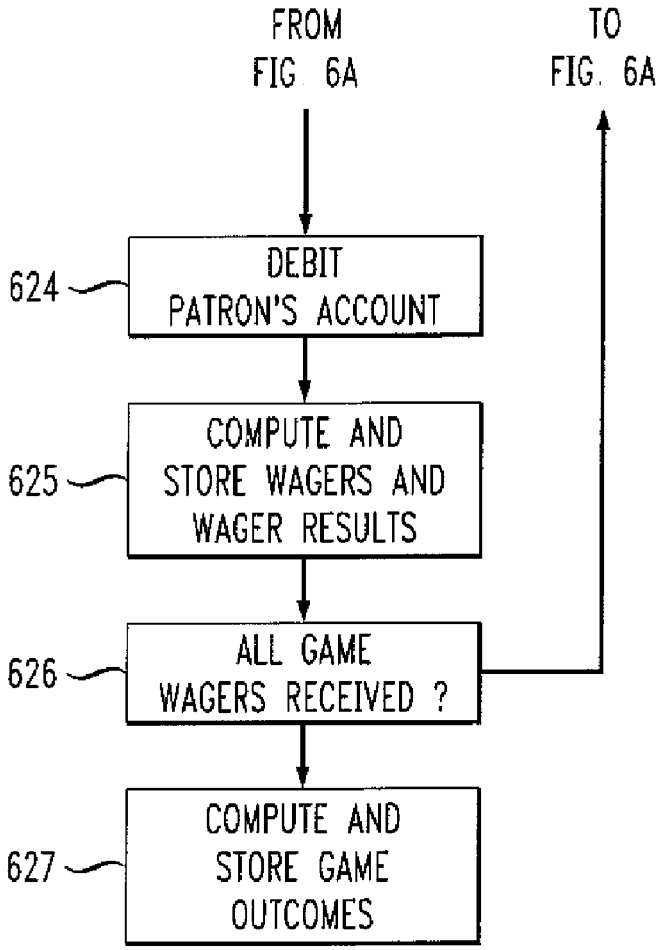

FIG. 6 is a flow diagram of an exemplary method of operating the exemplary gaming system of FIG. 1. The left side of FIG. 6 represent actions by the client terminal 102 and the right side represents actions by the server 108. In the exemplary method of FIG. 6, it is assumed that the patron already has established an account with system 100.

During step 602, the patron logs on at the client terminal 102 by entering logon information such as his/her patron identifier. The client terminal then sends a "logon" message, including the patron identifier, to server 108 (step 604). Although not shown in FIG. 6, if the client terminal 102 is not connected to server 108, a connection may be then established, for example, by using the communications device 410 (e.g., modem). The server 108 receives the "logon" message (step 601) and determines whether the patron identifier corresponds to an established patron account (step 605).

The method by which the patron enters the logon information may vary depending on the sending device and receiving device. For example, if the sending device is an infrared or radio frequency transmitter, the patron may not need to take any action to enter the logon information as long as the transmitter can communicate with a receiver. Alternatively, the patron may be required to enter, for example, his or her patron identifier.

Although not shown in FIG. 6, in response to the logon message from the client terminal 102, server 108 may send to the client terminal 102 an authentication message requiring the patron to authenticate his or her identity using, for example, a biometric device such as, a finger print scanner. In another embodiment, if the patron selected a PIN during account establishment, the patron may need to enter the PIN to log onto the client terminal 102 and authenticate his or her identity. Alternatively, the patron may be required to provide other information, such as social security number, to authenticate his or her identity.

Although not shown in FIG. 6, the client terminal 102 sends the authentication information that the patron provided and/or the client terminal retrieved from a sending device to server 108. Next, server 108 compares this information to the information stored in the patron's account file to authenticate the identity of the patron.

During step 606, server 108 performs a test on the results of the log-on verification. If the logon information and authentication information sent by the client terminal 102 does not match the information in database 508, server 108 sends an Invalid Log-on message to the client terminal 102. Client terminal 102 then displays the Invalid Log-on message (step 672) and the patron is asked to provide logon and/or authentication information again (step 602).

If the logon information and authentication information sent by the client terminal 102 matches the information in database 108, the server 108 retrieves the account file corresponding to the patron identifier from database 508 (step 607) and sends a first selection menu to the client terminal 102 for display to the patron (step 608).

After the client terminal 102 displays the selection menu, the client terminal 102 may receive, from the patron, a selection for the option to purchase wagers (step 609). In response, the client terminal 102 sends a wager purchase request message to server 508 (step 612). Server 108 then sends an acknowledge message and a wager selection menu to the client terminal 102, requesting additional information concerning the purchase of the wager (step 613). The client terminal 102 then prompts the patron to enter wager selection information (step 614). The wager selection information may include a purchase amount, a denomination value, and/or number of wagers that the patron desires to purchase. The purchase amount is the total amount of money that the patron wants to spend on wagers and the denomination value is the value of each wager. For example, if a patron wants to buy $10 worth of $1 wagers, the purchase amount would be $10 and the denomination value would be $1. In addition, the wager selection information may include one or more game identifiers to identify the type of game and the identification of an instance of the game(s) to be played. In this manner, a patron and his friends or family may provide the same game identifier and therefore place wagers in the same game in order to share the experience of playing together. In an alternative embodiment, a patron and his friends or family may request the server 108 to establish a private game that is only available to specific patrons. In other embodiments, the patron does not specify a particular instance of a game and server 108 assigns the patron to an instance of a game.

In one embodiment, the patron may be required to only submit a purchase amount. In this embodiment, server 108 may either use a denomination value specified by the facility or use the patron's normal wager amount as the denomination value. The normal wager amount, for example, may be the average denomination value of a patron's previous wagers and may be stored in database 508 along with the patron's other preference information. In another embodiment, if the patron is required to only submit a denomination value and number of wagers that the patron desires to purchase, the purchase amount may be calculated by multiplying the denomination value by the number of wagers that the patron desires to purchase. In still another embodiment, server 108 may ignore the denomination value, if any, provided by the patron and use a low denomination value, such as 5 cents. By using a low denomination value, systems, methods, and articles of manufacture consistent with the present invention allow the patron to vary the denomination value when revealing the results. This embodiment will be further described in detail along with the reveal process shown in FIG. 8.

The client terminal 102 then sends the patron wager selection information to server 108 (step 615). Server 108 then determines whether the patron's account balance can cover the patron selection (step 616) by comparing the amount of the wagers to the account balance. If the patron's account balance cannot cover the patron selection, server 108 sends an "insufficient funds message" to the client terminal 102 and returns to step 613 to resend a wager selection menu. The client terminal 102 may then display a message to the patron (indicating, for example, that purchase amount exceeds the patron's account balance) (step 617) and prompts the patron to enter new wager selection information (step 614). If the patron elects to enter a new selection, the client terminal 102 sends the new selection information to server 108 (steps 614 and 615). Systems, methods and articles of manufacture consistent with the invention may also allow the patron to deposit more funds into his or her account to cover the difference between the patron's account balance and selection.

On the other hand, if the patron account balance covers the patron selection, server 108 sends a confirmation request to the client terminal 108 (step 618) and the client terminal 102 prompts the patron to confirm the wager(s) (step 619). Client terminal 102 then performs a test to determine if the patron confirmed the wager (step 620). If the patron rejects or does not confirm the wager, the client terminal 102 sends a Rejection message to the server 108 and returns to step 609. If the patron confirms the selection information, the client terminal 102 sends a "confirmation" message to server 108 and returns to step 609.

During step 623, server 108 processes the message from client terminal 102. If the message is a Rejection message, server 108 returns to step 608; otherwise, server 108 debits the patron's account for the purchase amount (step 624). Although not shown, if the patron did not specify the number of wagers that the patron desires to purchase, server 108 may then calculate the number of wagers by dividing the purchase amount by the denomination value. These wagers are referred to in this application as mandatory wagers. Next, server 108 computes the wager result(s) and stores the wager(s) and wager result(s) in a transaction history file corresponding to the patron's account file (step 625) and, in the case of multi-player games, in a game status file corresponding to the game identifier.

Server 108 then performs a test to determine if all wagers have been received for the selected game (step 626). If all wagers have not been received, then server 108 returns to step 601 to wait for the purchase of additional wagers; otherwise, server 108 computes the outcome for each player of the game and, if applicable, the house based on the wager result(s). The outcome(s) are then stored in a game status file and in the transaction history files associated with the game's players (step 627).

Although not shown, server 108 may send a message to the client terminal 102 notifying the patron that the purchasing process is complete. Moreover, it will be apparent to one skilled in the art that the wager purchase process may be asynchronous. Specifically, once the patron confirms the selection information (step 620), the patron may continue to perform other tasks at the client terminal 102.

Figure 7A:
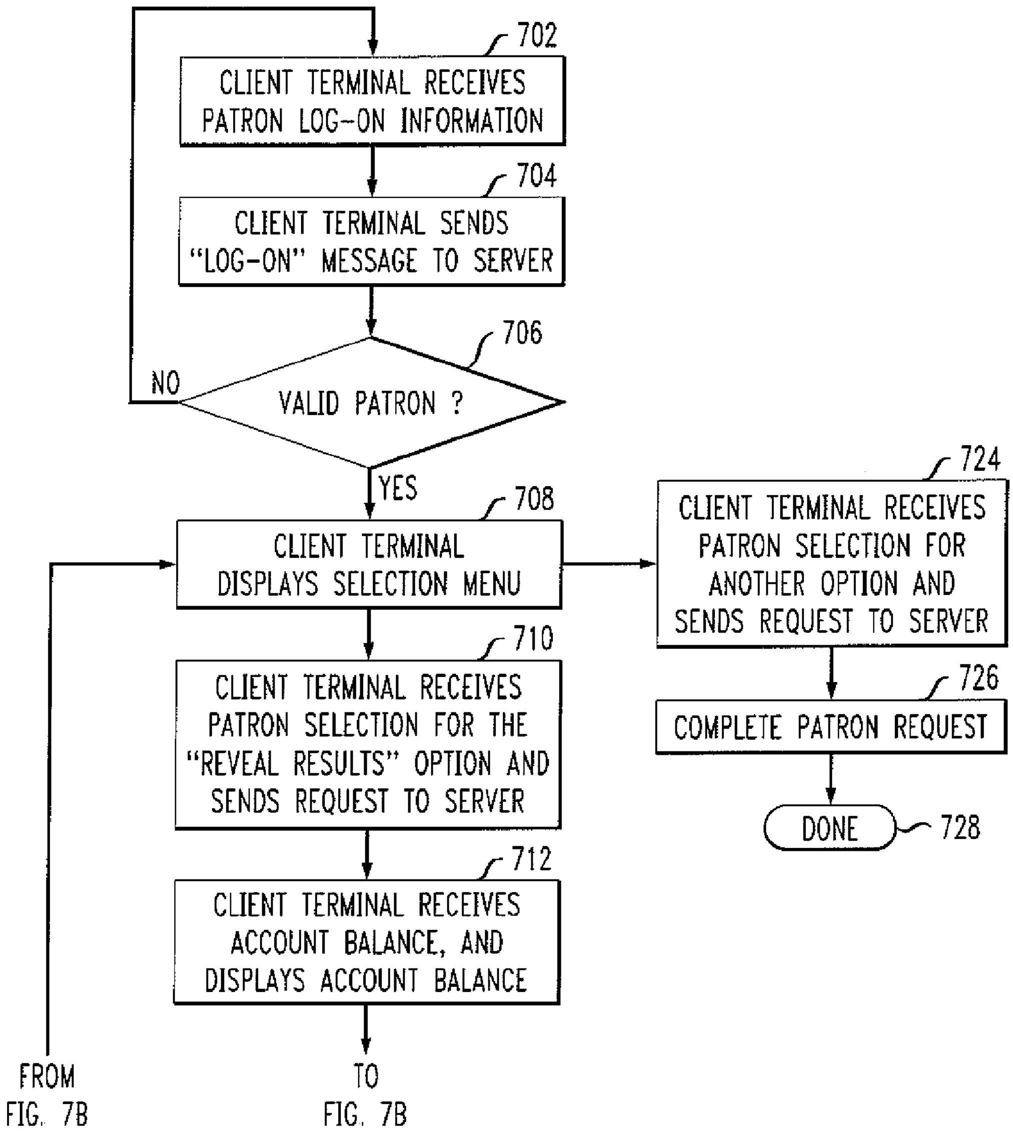
FIG. 7 is a flow diagram of an exemplary method for revealing the results of wagers.
Figure 7B:
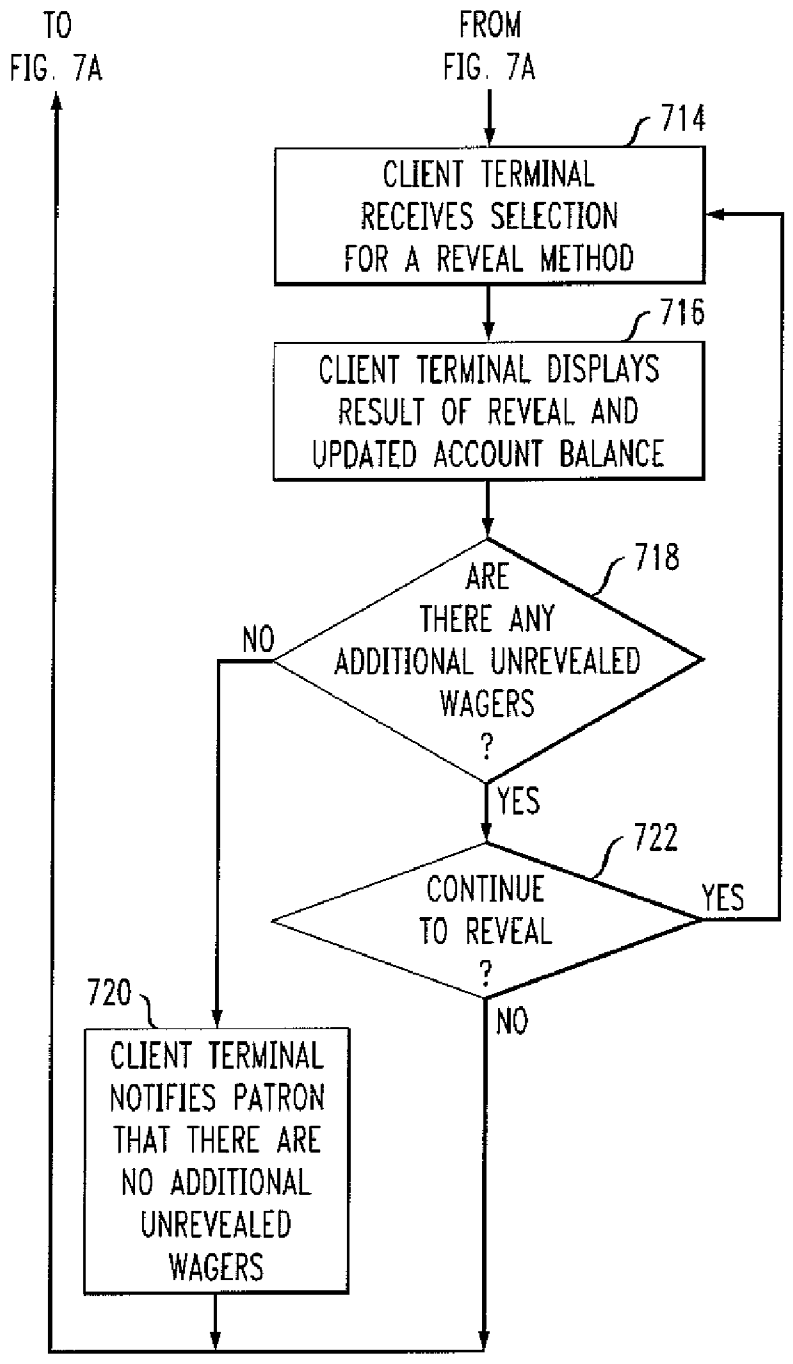

FIG. 7 is a flow diagram of an exemplary method for revealing the results of wagers. The patron may use either a client terminal 102 or an off-site client terminal 106 to reveal the results.

As shown in FIG. 7, the patron may log on at a client terminal 102 by entering logon information such as his/her patron identifier (step 702). Steps 702, 704, and 706 are similar to steps 602, 604, and 605, and thus, will not be further described in detail. If the logon information and authentication information sent by the client terminal match the information in database 108, server 108 sends a selection menu to the client terminal 102 for display to the patron (steps 706 and 708). Alternatively, the reveal component 404 may include a selection menu, which may be displayed to the patron.

The patron may select, for example, the "Reveal Results" option from the selection menu. The client terminal 102 receives the patron selection for the "Reveal Results" option and send a reveal request to server 108 (step 710). Server 108 receives the request, retrieves the patron's account balance, and sends the account balance to the client terminal 102. The client terminal 102 in turn displays the account balance to the patron (step 712). In addition, although not shown, the client terminal 102 may also display various reveal methods. The reveal methods may be the various games that are part of the reveal component or may be games displayed by server 108, for example, via servlets and java applets. Next, the client terminal 102 receives a selection for a reveal method from the patron (step 714). Once the patron selects the reveal method (step 714), the client terminal 102 sends a request to server 108 for the result of the first unrevealed wager (not shown). The server retrieves the result of the first unrevealed wager from the transaction history file corresponding to the patron's account and sends the result to the reveal component 404 (not shown).

Depending on the result, the reveal component 404 may display a particular graphical user interface indicating a win or a loss and an updated account balance if the result was a win (step 716). For example, if the result of a wager was a win in the amount of $1 and the patron is playing a "spinning fruit" game, the reveal component 404 may display the graphical user interface (e g , three apples) that indicates a win amount of $1. On the other hand, if the patron won $ 50, the reveal component 404 may display the combination (e g , two apples and one orange) that indicates a win amount of $0.50.

On the other hand, instead of sending the result to the reveal component 404, the server 108 may send a particular graphical user interface to a client terminal 102 for display to a user depending on the game and whether the result of the wager was a win or a loss (step 716), for example, by using servlets and java applets.

In the case of multi-player games, the servlets and java applets may also display the wagers, outcomes, and wager results for the other players in the game and for the house (if applicable). In an alternative embodiment, two or more of the players in a game may log-on at the same time to reveal the results of a game. In the case where two or more client terminals 102 are utilized, server 108 can synchronize the step of revealing the results such that the outcome will be revealed to all participating players at substantially the same time. For example, in a game of five card stud poker, cards can be revealed one at a time, separated by a specific period of time (e.g., one card per second). Each card will be displayed to all participating players at substantially the same time. A virtual gaming environment can therefore be created among a number of players who are geographically separated.

In addition, server 108 also may send an updated account balance to the client terminal 102 for display to the patron (step 716). In another embodiment, the client terminal 102 may just update the account balance based on the result and display it to the patron (step 716). Moreover, although not shown, the server 108 may flag the particular wager in the transaction history file to indicate that the wager has been revealed.

In another embodiment, in addition to selecting a reveal method, the patron may be given the option of selecting a denomination value for each wager (step 714). This denomination value may be equal to or less than the denomination value specified by the patron when the patron purchased the wagers. Several methods may be used to allow patrons to change the denomination value when revealing the results. For example, when determining the results of the wagers, server 108 may ignore the denomination value, if any, specified by the patron and instead use wagers that have a low value, for example, 5 cents. By using a low denomination value when determining the results of the wagers, the patron may be able to vary the denomination value when revealing the results. For example, while a patron might specify a denomination value of $1 when purchasing wagers, the server 108 may ignore this selection and instead determine the results of the wagers with a denomination value of $0.25. During the reveal process, if the patron specifies a first denomination value of $1.50, the server may aggregate the result of the first six $0.25 cent wagers to determine the result of a $1.50 wager. Later, if the patron specifies a second denomination value of $0.50, the server may aggregate the result of the first two wagers to determine the result of a 5.50 wager.

Next, server 108 determines whether there are any additional unrevealed wagers (step 718), for example, by examining the transaction history file. If there are additional unrevealed wagers, the patron may be given the option of revealing these wagers (step 722). If the patron does want to reveal these unrevealed wagers, the reveal process is repeated (Step 714).

On the other hand, if server 108 determines that there are no additional unrevealed wagers, server 108 may send a message to the client terminal 102 for display to the patron notifying the patron that there are no more unrevealed wagers (steps 718 and 720).

If the patron does want to stop revealing or if the server 108 has determined that there are no additional unrevealed wagers, the server 108 may display the selection menu again (steps 722, 718, 720, and 708). The patron may select other options, such as logoff (step 724). Server 108 completes the patron request and the process is complete (step 728).

In one embodiment, other options that may be available to the patron (step 724) include buying additional wagers. In another embodiment, in step 724, the patron may be able to locate other patrons and/or communicate with other patrons. In still another embodiment, in step 724, if a facility awards complimentary points to a patron for playing games, the patron may be able to check the total number of complimentary points that he or she has earned and/or use these complementary points to obtain items offered by the facility. In addition to using complementary points to obtain items, the patron also may be able to purchase other items.

After completing the process 700 in FIG. 7, if the patron has any unrevealed wagers, the patron may log onto a client terminal 102 to reveal the results of these wagers and repeat the process shown in FIG. 7. Upon receiving the logon message, server 108 may erase the unrevealed wagers and add the money applied towards the unrevealed wagers, and the wager pool to the patron's account balance. The patron may use this updated account balance to, for example, play traditional games. Alternatively, the patron may go to service client terminal 104 and request that the patron's unrevealed wagers be erased and request a refund of the money that was applied towards the unrevealed wagers, wager pool, and or any of his account balance. In the latter two embodiments, when erasing the unrevealed wagers, the server 108 may record the results of these unrevealed wagers in the patron account file and apply these results to wagers that the patron purchases in the future. Other such methods will be apparent to those skilled in the art from the forgoing and following description and thus, are within the scope of the present invention. For example, the patron may not choose to reveal results and may return to the facility and request a refund. Alternatively, the patron could come back to the facility and may want to use the money applied towards the unrevealed wagers to play traditional games.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radiowave and infrared data communications. Examples of program instructions include both machine codes, such as produced by compiler, and files containing a high level code that can be executed by the computer using an interpreter.

It is to be understood that the embodiments and variations shown and described herein are merely illustrative of the principles of this invention and that various modifications may be implemented by those skilled in the art without departing from the scope and spirit of the invention.

We claim:

1. A gaming method, comprising:

receiving, at a server, from one or more first client terminals before a game play has begun, at least one purchase request, said at least one purchase request identifying a wager for a player of one or more multi-player games, wherein said one or more multi-player games are games in which two or more players participate;

determining, at said server, a game result of said wager for each player in said multi-player game before a game play has begun for any of said players in said multi-player game;

storing, at the server, the game result of said wager for said player in a database before the game play has begun;

receiving, at the server, from a second client terminal during the game play, a request to reveal the game result of said wager for said player; and sending, from the server, the game result of said wager for said player to the second client terminal.

2. The method of claim 1, wherein said determining step is executed after all wager game results for one of said one or more multi-player games have been received.

3. The method of claim 1, further comprising the step of determining an outcome for a house based on said game result.

4. The method of claim 3, wherein said step of determining said outcome for said house is executed after all game results for one of said one or more multi-player games have been received.

5. The method of claim 1, wherein said received at least one purchase request comprises one or more of the following: a purchase amount, a denomination value, and a number of wagers.

6. The method of claim 1, wherein said received at least one purchase request comprises a game identifier, wherein said game identifier identifies one or more of the following: a game type or an instance of a game.

7. The method of claim 1, wherein said received at least one purchase request comprises a purchase request from a client terminal located at a gaming facility.

8. The method of claim 1, further comprising the step of receiving a patron identifier identifying a purchaser of said wager.

9. The method of claim 8, further comprising the step of debiting an account balance of a patron account corresponding to the received patron identifier based on said received purchase request.

10. The method of claim 1, wherein said game result is stored in a transaction history file in a patron account file corresponding to a received patron identifier.

11. The method of claim 1, wherein said game result is stored in a game status file corresponding to an instance of a game.

12. The method of claim 1, wherein said wager game result is sent via an online network.

13. The method of claim 1, further comprising the step of determining an outcome for each player in said multi-player game.

14. The method of claim 13, wherein said determining said outcome step is executed after all wager game results for said multi-player game have been received.

15. The method of claim 1, wherein said sending step includes sending a selection menu including an option to purchase at least one wager.

16. The method of claim 1, further comprising the steps of:

receiving from said first client terminal a selection for the option to purchase at least one wager;

requesting information for the purchase of the at least one-wager; and receiving, from said first client terminal, said information for the purchase of the at least one wager.

17. The method of claim 16, wherein said purchase request includes one or more of the following: a purchase amount, a denomination value, and a number of wagers.

18. The method of claim 16, wherein said purchase request includes one or more of the following: a game type or an instance of a game.

19. The method of claim 1, further comprising the step of using said wager game result to purchase additional wagers in a repetitive manner.

20. The method of claim 1, further comprising the step of requesting authentication data.

21. The method of claim 20, wherein said requesting authentication data step further comprises the step of requesting biometric data.

22. The method claim 1, wherein said determining step is performed substantially at a time of said purchase request.

23. The method claim 1, wherein said determination is performed substantially at a time of said purchase request.

24. A computer-readable medium containing instructions for causing a computer to perform a gaming method, which when executed implement the steps of:

receiving, at a server, from one or more first client terminals before a game play has begun, at least one purchase request, said at least one purchase request identifying a wager for a player of one or more multi-player games, wherein said one or more multi-player games are games in which two or more players participate;

determining, at said server, a game result of said wager for each player in said multi-player game before a game play has begun for any of said players in said multi-player game;

storing, at the server, the result of said game wager for said player in a database before the game play has begun;

receiving, at the server, from a second client terminal during the game play, a request to reveal the game result of said wager for said player; and sending, from the server, the game result of said wager for said player to the second client terminal.

25. A gaming system, comprising:

a memory; and at least one processor, coupled to the memory, operative to:

receive, at a server, from one or more first client terminals before a game play has begun, at least one purchase request, said at least one purchase request identifying a wager for a player of one or more multi-player games, wherein said one or more multi-player games are games in which two or more players participate;

determine, at said server, a game result of said wager for each player in said multi-player game before a game play has begun for any of said players in said multi-player game;

store, at the server, the game result of said wager for said player in a database before the game play has begun;

receive, at the server, from a second client terminal during the game play, a request to reveal the game result of said wager for said player; and send, from the server, the game result of said wager for said player to the second client terminal.

26. A server connected to a plurality of client terminals in a gaming system, comprising:

a memory; and at least one processor, coupled to the memory, operative to:

receive, at a server, from one or more first client terminals before a game play has begun, at least one purchase request, said at least one purchase request identifying a wager for a player of one or more multi-player games, wherein said one or more multi-player games are games in which two or more players participate;

determine, at said server, a game result of said wager for each player in said multi-player game before a game play has begun for any of said players in said multi-player game;

store, at the server, the game result of said wager for said player in a database before the game play has begun;

receive, at the server, from a second client terminal during the game play, a request to reveal the game result of said wager for said player; and send, from the server, the game result of said wager for said player to the second client terminal.

* * * * *